(12) United States Patent
Guo et al.

(10) Patent No.: US 12,418,047 B2
(45) Date of Patent: Sep. 16, 2025

(54) ELECTROLYTE, SECONDARY BATTERY, BATTERY MODULE, BATTERY PACK, AND POWER CONSUMING DEVICE

(71) Applicant: CONTEMPORARY AMPEREX TECHNOLOGY (HONG KONG) LIMITED, Hong Kong (CN)

(72) Inventors: Jie Guo, Ningde (CN); Changlong Han, Ningde (CN); Bin Jiang, Ningde (CN); Zeli Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 497 days.

(21) Appl. No.: 18/145,541

(22) Filed: Dec. 22, 2022

(65) Prior Publication Data

US 2023/0163357 A1 May 25, 2023

Related U.S. Application Data

(63) Continuation of application No. PCT/CN2021/131118, filed on Nov. 17, 2021.

(51) Int. Cl.
*H01M 10/0567* (2010.01)
*H01M 10/0569* (2010.01)

(52) U.S. Cl.
CPC ... *H01M 10/0567* (2013.01); *H01M 10/0569* (2013.01); *H01M 2300/004* (2013.01)

(58) Field of Classification Search
CPC ......... H01M 10/0567; H01M 10/0568; H01M 10/0569
See application file for complete search history.

(56) References Cited

U.S. PATENT DOCUMENTS

| 2019/0081355 | A1 | 3/2019 | Nakayama | |
|---|---|---|---|---|
| 2021/0242498 | A1* | 8/2021 | Li | H01M 10/0568 |
| 2024/0136578 | A1* | 4/2024 | Iwasaki | C07D 277/14 |

FOREIGN PATENT DOCUMENTS

| CN | 101884126 A | 11/2010 |
|---|---|---|
| CN | 105655644 A | 6/2016 |

(Continued)

OTHER PUBLICATIONS

The World Intellectual Property Organization (WIPO) International Search Report and Written Opinion for PCT/CN2021/131118 Aug. 1, 2022 11 pages (including English translation).

(Continued)

*Primary Examiner* — Christopher P Domone
(74) *Attorney, Agent, or Firm* — ANOVA LAW GROUP, PLLC

(57) ABSTRACT

An electrolyte for a secondary battery includes a solvent, a lithium salt, and a film-forming additive. A content of the film-forming additive is 0.1%-10% by mass of a total mass of the electrolyte, and the content of the film-forming additive satisfies:

$$0.1*10^{-2} \leq \frac{A*B}{M*(C+N)} \leq 3*10^{-2}.$$

A is a mass percentage of the film-forming additive in the total mass of the electrolyte. B is an electrolyte retention coefficient of the secondary battery, in g/Ah. M is a mass of a positive electrode active material required per unit capacity of the secondary battery, in g/Ah. N is a mass percentage of nickel in the positive electrode active material contained (Continued)

in the secondary battery. and C is a mass percentage of Co in the positive electrode active material contained in the secondary battery.

20 Claims, 4 Drawing Sheets

(56) References Cited

FOREIGN PATENT DOCUMENTS

| CN | 105932325 A | 9/2016 |
|---|---|---|
| CN | 106058316 A | 10/2016 |
| CN | 106252639 A | 12/2016 |
| CN | 110265721 A | 9/2019 |
| CN | 112909319 A | 6/2021 |
| EP | 1204157 A2 | 5/2002 |
| EP | 3651254 A1 | 5/2020 |
| JP | 2003338281 A | 11/2003 |
| JP | 2009245922 A | 10/2009 |
| JP | 2018190719 A | 11/2018 |
| WO | 2014192208 A1 | 12/2014 |
| WO | WO2020043153 * | 3/2020 |

OTHER PUBLICATIONS

China National Intellectual Property Administration (CNIPA) Office Action 1 for Application No. 202180093316.8 May 21, 2024 9 Pages (including translation).
The European Patent Office (EPO) The Extended Search Report for EP Application No. 21942128.6 Jul. 26, 2023 8 Pages.

* cited by examiner

ELECTROLYTE, SECONDARY BATTERY, BATTERY MODULE, BATTERY PACK, AND POWER CONSUMING DEVICE

CROSS-REFERENCE TO RELATED APPLICATION

This application is a continuation of International Application No. PCT/CN2021/131118, filed on Nov. 17, 2021, the entire content of which is incorporated herein by reference.

TECHNICAL FIELD

The present application relates to technical field of secondary batteries, and in particular, to an electrolyte for a secondary battery, a secondary battery, a battery module, a battery pack, and a power consuming device.

BACKGROUND ART

In recent years, with the increasing application range of lithium-ion batteries, lithium-ion batteries are widely used in energy storage power systems such as hydroelectric, thermal, wind and solar power stations, as well as electric tools, electric bicycles, electric motorcycles, electric vehicles, military equipment, aerospace and other fields. Due to the great development of lithium-ion batteries, higher requirements have also been placed on the lithium-ion secondary batteries in terms of energy density, cycle performance, safety performance, etc. Currently, a Co-doped nickel positive electrode active material is considered as a choice to meet the requirement of high energy density. The increase of the Co content in the positive electrode material is helpful to increase the order of materials and improve the performance of batteries. However, since Co is expensive, it is expected that the content of Co in positive electrode materials will be reduced or even no Co will be found in consideration of low cost. However, the reduced content of the Co can lead to the deterioration of an structural stability of an electrode, resulting in an increase of surface Rct (charge transfer impedance), which in turn leads to the deterioration of cycle DCR (direct current resistance) increase. Therefore, achieving the surface stability of low-Co positive electrode materials and improving cycle and cycle DCR increase have become urgent problems to be solved.

SUMMARY

The present application solves the above technical problems from the aspect of electrolytes, and an objective thereof is to provide an electrolyte for a low-Co system secondary battery, so as to reduce the Co content in a positive electrode material, but maintain the stability of the positive electrode material, such that good battery cycle and cycle DCR increase performance can still be obtained.

In order to achieve the above objective, the present application provides a non-aqueous electrolyte for a low-Co system secondary battery.

A first aspect of the present application provides an electrolyte for a secondary battery, the electrolyte comprises a solvent, a lithium salt, and a film-forming additive, the content of the film-forming additive is 0.1%-10% by mass of the total mass of the electrolyte, and the content of the film-forming additive satisfies the following formula (1):

$$0.1 \times 10^{-2} \leq \frac{A*B}{M*(C+N)} \leq 3 \times 10^{-2} \quad (1)$$

wherein A is the mass percentage of the film-forming additive in the total mass of the electrolyte; B is the electrolyte retention coefficient of the secondary battery, in g/Ah; M is the mass of the positive electrode active material required per unit capacity of the secondary battery, in g/Ah; N is the mass percentage of nickel in the positive electrode active material contained in the secondary battery; and C is the mass percentage of Co in the positive electrode active material contained in the secondary battery.

Therefore, in the present application, by using the electrolyte, the film-forming additive contained in the electrolyte and the relationship between its content and the content of Ni and Co in the positive electrode active material, such that the low content of Co in the positive electrode material is realized, and the stability of the positive electrode material and the excellent battery performance are maintained.

In the embodiments of the present application, the formula (1) satisfies the following condition:

$$0.4 \times 10^{-2} \leq \frac{A*B}{M*(C+N)} \leq 2.1 \times 10^{-2}.$$

The content of the film-forming additive in the electrolyte and the content of Ni and Co in the positive electrode active material satisfy the formula (1), which further realizes the stability of the low-Co positive electrode material, as well as a better cycle life and a lower cycle DCR increase.

In the embodiments of the present application, the film-forming additives are at least one selected from the group consisting of: difluorophosphate compounds, cyclic carbonate compounds, fluorinated cyclic carbonate compounds, cyclic sulfate compounds, and sulfonate compounds; in some embodiments, difluorophosphate compounds. These film-forming additives can preferentially form a stable interfacial film on the surface of a positive electrode to reduce the occurrence of the side reactions of the positive electrode, and can be combined with Li or Ni on the surface of the positive electrode to stabilize the structure of the positive electrode material and slow down the occurrence of phase change, thereby inhibiting the increase of Rct, and improving dynamics of the positive electrode material, thus reducing the DCR increase of the low-Co positive electrode material during cycling, and improving the cycle of the battery. In addition, the combined use of these film-forming additives can realize the film-forming protection of the positive and negative electrodes, which ensures quick charge while reducing the side reactions of the positive and negative electrodes, thereby ensuring various performances of a lithium-ion battery during use, such as storage, cycle, rate performances, etc.

In the embodiments of the present application, the difluorophosphate compounds have the following structure:

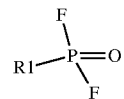

wherein R1 is selected from a hydrogen atom, an oxygen atom, a carbon atom, a nitrogen atom, a sulfur atom, a phosphorus atom, a fluorine atom, an alkyl group, a phenyl group, an alkoxy group, a phenoxy group, a fluorine-containing alkyl group, a fluorine-containing phenyl group, a fluorine-containing alkoxy group or a fluorine-containing phenoxy group. Further, the alkyl group is a $C_1$-$C_{10}$ alkyl group, optionally, a $C_1$-$C_6$ alkyl group; and/or the alkoxy group is a $C_1$-$C_{10}$ alkoxy group, optionally, a $C_1$-$C_6$ alkoxy group; and/or the fluorine-containing alkyl group is a $C_1$-$C_{10}$ fluorine-containing alkyl group, optionally, a $C_1$-$C_6$ fluorine-containing alkyl group; and/or the fluorine-containing alkoxy group is a $C_1$-$C_{10}$ fluorine-containing alkoxy group, optionally, a $C_1$-$C_6$ fluorine-containing alkoxy group.

Further, the difluorophosphate compounds are at least one selected from the group consisting of: butyl difluorophosphate and phenyl difluorophosphate. Butyl difluorophosphate and phenyl difluorophosphate have lower oxidation potential and higher reduction potential, can preferentially form films on cathode and anode, which can change the film-forming mechanism of the positive and negative electrodes, and obviously reduce the impedance of the electrodes and the increase of electrode impedance during cycling, thereby stabilizing the structure of the electrodes during cycling.

In the embodiments of the present application, the content of the film-forming additive is 0.5%-3% by mass of the total mass of the electrolyte. The content of the film-forming additive within the range can stabilize the structure of the positive electrode material and ensure good cycle of the battery.

In the embodiments of the present application, the secondary battery has an electrolyte retention coefficient of 2 g/Ah to 4 g/Ah. The electrolyte retention coefficient of the secondary battery within the range is beneficial to the stability of the positive electrode material of the battery during operation and the realization of good cycle performance.

In the embodiments of the present application, the mass range of the positive electrode active material required per unit capacity of the secondary battery is 4 g/Ah to 10 g/Ah. The mass range of the positive electrode active material ensures the normal operation of the secondary battery and realizes the required unit capacity.

In the embodiments of the present application, the cyclic carbonate compounds are selected from vinylene carbonate, vinyl ethylene carbonate or a combination thereof; and/or the fluorinated cyclic carbonate compounds are selected from fluoroethylene carbonate, 4,4-difluoroethylene carbonate, 4,5-difluoroethylene carbonate or a combination thereof; and/or the sulfate compounds are selected from 1,3,2-dioxathiolane-2,2-dioxide, 4,4-bis(1,3,2-dioxathiolane)-2,2,2,2-tetraoxide or a combination thereof; and/or the sulfonate compounds are selected from 1,3-propane sultone, propylene sultone, butene sultone, vinyl methanedisulfonate or a combination thereof. These further selected film-forming additives can better form a stable interfacial film on the surface of the positive electrode, which can reduce the occurrence of the side reactions of the positive electrode, and improve the cycle of the battery. In addition, the combined use of these film-forming additives and difluorophosphate compounds can realize the film-forming protection of the positive and negative electrodes, which ensures the quick charge while reducing the side reactions of the positive and negative electrodes, thereby ensuring various performances of the lithium-ion battery during use, such as storage, cycle, rate performance, etc.

In the embodiments of the present application, the lithium salt is at least one selected from $LiN(SO_2F)_2$(LiFSI), $LiPF_6$, $LiBF_4$, $LiN(CF_3SO_2)_2$(LiTFSI), $LiClO_4$, $LiAsF_6$, $LiB(C_2O_4)_2$(LiBOB), $LiBF_2C_2O_4$(LiDFOB), and lithium difluorobis(oxalato)phosphate (LiDFOP). The lithium salts can improve the stability of the electrolyte and the positive and negative electrode materials, can form a stable interface film on the electrode surface, which can effectively inhibit the decomposition of the electrolyte and the destruction of the electrode structure during high-voltage cycle, thereby improving the electrochemical performance of the battery, especially the cycle performance.

In the embodiments of the present application, the solvent is at least one selected from ethylene carbonate, propylene carbonate, fluoroethylene carbonate, dimethyl carbonate, diethyl carbonate, methyl propyl carbonate, ethyl methyl carbonate, ethyl acetate, methyl acetate, ethyl propionate, acetonitrile, tetrahydrofuran, 2-methyltetrahydrofuran, and 1,3-dioxolane. These solvents are beneficial to the stability of the battery during operation.

A second aspect of the present application further provides a method for evaluating the relationship between the content of a film-forming additive in an electrolyte of a secondary battery and the content of nickel and cobalt in a positive electrode active material, the method comprises allowing the content of the film-forming additive, the nickel and the cobalt to satisfy the following formula (1):

$$0.1 \times 10^{-2} \leq \frac{A * B}{M * (C + N)} \leq 3 \times 10^{-2} \qquad (1)$$

wherein A is the mass percentage of the film-forming additive in the total mass of the electrolyte; B is the electrolyte retention coefficient of the secondary battery, in g/Ah; M is the mass of the positive electrode active material required per unit capacity of the secondary battery, in g/Ah; N is the mass percentage of nickel in the positive electrode active material of the secondary battery; and C is the mass percentage of Co in the positive electrode active material of the secondary battery.

Therefore, the present application establishes the relationship between the amount of the film-forming additive in the electrolyte of the secondary battery and the content of Ni and Co in the positive electrode material for the first time, so as to guide the use of the film-forming additive in the electrolyte of low-Co positive electrode material. The surface of the positive electrode material of the secondary battery satisfying the relationship has better stability, better cycle life, and lower cycle DCR increase.

A third aspect of the present application provides a secondary battery, comprising a positive electrode, a negative electrode, and the electrolyte of the first aspect of the present application. Further, the positive electrode active material of the secondary battery is a nickel-cobalt-manganese ternary material, and its structural formula is $LiNi_xCo_yMn_zO_2$, wherein $0.5 \leq x \leq 0.85$, $0.01 \leq y \leq 0.2$, $0 \leq z \leq 0.5$, and $x+y+z=1$. Further, the negative electrode active material of the secondary battery is at least one selected from artificial graphite, natural graphite, soft carbon, hard carbon, and a silicon-based material.

In a fourth aspect, the present application provides a battery module, comprising a secondary battery of the third aspect of the present application.

In a fifth aspect, the present application provides a battery pack, comprising a battery module of the fourth aspect of the present application.

A sixth aspect of the present application provides a power consuming device, comprising at least one of the secondary battery of the third aspect of the present application, the battery module of the fourth aspect of the present application, or the battery pack of the fifth aspect of the present application.

In the present application, the film-forming additive is added into the electrolyte of the secondary battery, such that the content of the film-forming additive and the content of Co and Ni in the positive electrode material of the secondary battery satisfy a certain relationship, such that the stability of the low-Co positive electrode material are improved during the operation of the battery, thereby improving the cycle performance of the battery, and reducing the cycle DCR increase. It has been found for the first time in the present application that the amount of the film-forming additive in the secondary battery and the content of Ni and Co in the positive electrode material need to satisfy a certain relationship, and the relationship is established for the first time, such that an electrolyte suitable for the secondary battery with the low-Co positive electrode material can be obtained, the low-Co positive electrode material has good stability, and the secondary battery with a good cycle is obtained.

Figure 1:
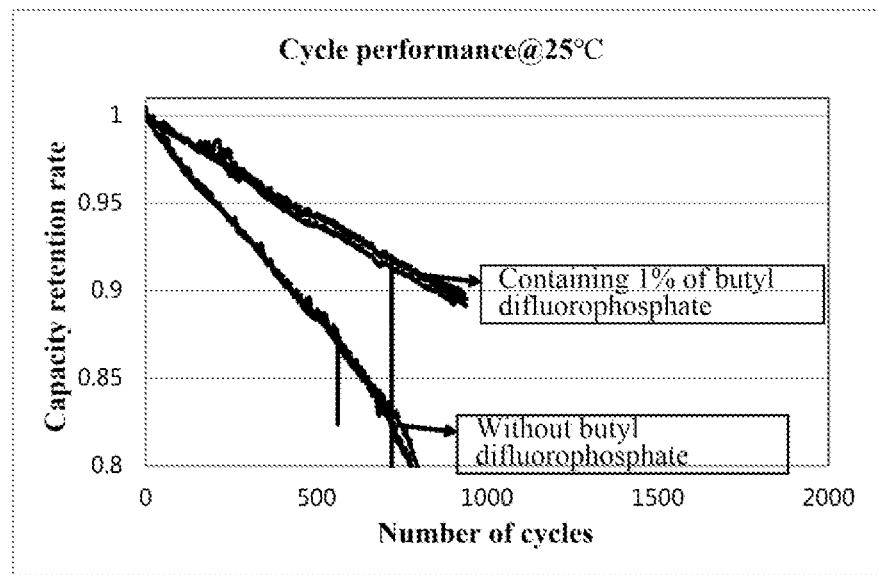
FIG. 1 shows the cycle performance of the secondary battery according to Example 3 of the present application at 25° C. compared with a comparative example.

LIST OF REFERENCE NUMERALS 1 battery pack; 2 upper case body; 3 lower case body; 4 battery module; 5 secondary battery; 51 housing; 52 electrode assembly; 53 top cover assembly

DETAILED DESCRIPTION OF EMBODIMENTS

Hereinafter, embodiments of an electrolyte of a secondary battery, a positive electrode plate, a negative electrode plate, the secondary battery, a battery module, a battery pack, and a power consuming device of the present application are described in detail and specifically disclosed with reference to the accompanying drawings appropriately. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if minimum range values 1 and 2 are listed, and maximum range values 3, 4, and 5 are listed, the following ranges are all contemplated: 1-3, 1-4, 1-5, 2-3, 2-4, and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and "0-5" is just an abbreviated representation of combinations of these numerical values. In addition, when a parameter is expressed as an integer of ≥2, it is equivalent to disclosing that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, in some embodiments sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), and also steps (c), (a) and (b), etc.

The terms "comprise" and "include" mentioned in the present application are open-ended or closed-ended. For example, "comprise" and "include" may mean that other components not listed may further be comprised or included.

In the present application, the term "or" is inclusive unless otherwise specified. For example, the phrase "A or B" means "A, B, or both A and B". More specifically, a condition "A or B" is satisfied by any one of the following: A is true (or present) and B is false (or not present); A is false (or not present) and B is true (or present); or both A and B are true (or present).

One embodiment of the present application provides an electrolyte for a secondary battery, the electrolyte comprises a solvent, a lithium salt, and a film-forming additive, the content of the film-forming additive is 0.1%-10% by mass of the total mass of the electrolyte, and the content of the film-forming additive satisfies the following formula (1):

$$0.1 \times 10^{-2} \leq \frac{A * B}{M * (C + N)} \leq 3 \times 10^{-2} \quad (1)$$

wherein A is the mass percentage of the film-forming additive in the total mass of the electrolyte; B is the electrolyte retention coefficient of the secondary battery, in g/Ah; M is the mass of the positive electrode active material required per unit capacity of the secondary battery, in g/Ah; N is the mass percentage of nickel in the positive electrode active material contained in the secondary battery; and C is the mass percentage of Co in the positive electrode active material contained in the secondary battery.

Although the mechanism is not clear, the present applicant has unexpectedly found that the secondary battery using the above electrolyte can reduce the Co content in the positive electrode material while achieving good electrochemical cycle performance. In the positive electrode material of the secondary battery, increasing the Co content is helpful to reduce the mixed arrangement of Li and Ni, and increase the order of the material. However, the high cost of Co is not conducive to reducing the cost of the battery. Nevertheless, if the amount of Co in the positive electrode material is reduced, the structure of the positive electrode material will be unstable during the operation of the battery, resulting in poor cycle performance and shortened cycle life of the battery. According to the present application, a certain amount of film-forming additives are added in the electrolyte, which can preferentially form a stable interfacial film on the surface of a positive electrode during the operation of the battery, and can also be combined with Li or Ni on the surface of the positive electrode to reduce the occurrence of the side reactions of the positive electrode, stabilize the structure of the positive electrode material and slow down the occurrence of phase change, thereby inhibiting the increase of Rct (charge transfer impedance), and improving dynamics of the positive electrode material, thus reducing the increase of DCR (direct current resistance) of the positive electrode material during cycling, and improving the cycle performance of the battery. Although the mechanism is still unclear, the present inventor has found that: the content of the film-forming additive and the content of Co and Ni in the positive electrode material of the secondary battery satisfy a certain relationship, such that the structural stability of the positive electrode material during the operation of the battery can be maintained while the Co content in the positive electrode material is reduced, thereby achieving excellent cycle. The relationship has been found and established for the first time in the present application, the electrolyte suitable for the secondary battery with the low-Co positive electrode material is obtained based on the relationship, such that the good stability of the low-Co positive electrode material is realized, and the secondary battery the with a good cycle is obtained with a low cost.

In some embodiments of the present application $$\frac{A * B}{M * (C + N)}$$

can be $0.1 \times 10^{-2}$, $0.2 \times 10^{-2}$, $0.3 \times 10^{-2}$, $0.4 \times 10^{-2}$, $0.5 \times 10^{-2}$, $0.6 \times 10^{-2}$, $0.7 \times 10^{-2}$, $0.8 \times 10^{-2}$, $0.9 \times 10^{-2}$, $1 \times 10^{-2}$, $1.1 \times 10^{-2}$, $1.2 \times 10^{-2}$, $1.3 \times 10^{-2}$, $1.4 \times 10^{-2}$, $1.5 \times 10^{-2}$, $1.6 \times 10^{-2}$, $1.7 \times 10^{-2}$, $1.8 \times 10^{-2}$, $1.9 \times 10^{-2}$, $2.0 \times 10^{-2}$, $2.1 \times 10^{-2}$, $2.2 \times 10^{-2}$, $2.3 \times 10^{-2}$, $2.4 \times 10^{-2}$, $2.5 \times 10^{-2}$, $2.6 \times 10^{-2}$, $2.7 \times 10^{-2}$, $2.8 \times 10^{-2}$, $2.9 \times 10^{-2}$ or $3 \times 10^{-2}$, or within a range with any two of these values as an upper limit and a lower limit (including the upper and lower limits).

In some embodiments of the present application, the above formula (1) further satisfies the following relationship:

$$0.4 \times 10^{-2} \leq \frac{A * B}{M * (C + N)} \leq 2.1 \times 10^{-2}.$$

In some embodiments, the above formula (1) further satisfies the following relationship:

$$0.42 \times 10^{-2} \leq \frac{A * B}{M * (C + N)} \leq 1.04 \times 10^{-2}.$$

In some embodiments of the present application, the film-forming additive is at least one selected from the group consisting of: difluorophosphate compounds, cyclic carbonate compounds, fluorinated cyclic carbonate compounds, cyclic sulfate compounds, and sulfonate compounds; in some embodiments, difluorophosphate compounds. These film-forming additives can preferentially form a stable interfacial film on the surface of a positive electrode to reduce the occurrence of the side reactions of the positive electrode, and can be combined with Li or Ni on the surface of the positive electrode to stabilize the structure of the positive electrode material and slow down the occurrence of phase change, thereby inhibiting the increase of Rct, and improving dynamics of the positive electrode material, thus reducing the DCR increase of the low-Co positive electrode material during cycling, and improving the cycle of the battery. In addition, the combined use of these film-forming additives can realize the film-forming protection of the positive and negative electrodes, which ensures quick charge while reducing the side reactions of the positive and negative electrodes, thereby ensuring various performances of a lithium-ion battery during use, such as storage, cycle, rate performances, etc.

In some embodiments of the present application, the difluorophosphate compounds have the following structure:

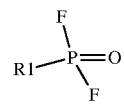

wherein R1 is selected from a hydrogen atom, an oxygen atom, a carbon atom, a nitrogen atom, a sulfur atom, a phosphorus atom, a fluorine atom, an alkyl group, a phenyl group, an alkoxy group, a phenoxy group, a fluorine-containing alkyl group, a fluorine-containing phenyl group, a fluorine-containing alkoxy group or a fluorine-containing phenoxy group. The alkyl group may be a $C_1$-$C_{10}$ alkyl group or a $C_1$-$C_6$ alkyl group. The alkoxy group may be a $C_1$-$C_{10}$ alkoxy group or a $C_1$-$C_6$ alkoxy group. The fluorine-containing alkyl group may be a $C_1$-$C_{10}$ fluorine-containing alkyl group or a $C_1$-$C_6$ fluorine-containing alkyl group. The fluorine-containing alkoxy group may be a $C_1$-$C_{10}$ fluorine-containing alkoxy group or a $C_1$-$C_6$ fluorine-containing alkoxy group.

Further, the difluorophosphate compounds are selected from: butyl difluorophosphate, phenyl difluorophosphate, and a combination thereof. Butyl difluorophosphate and phenyl difluorophosphate have lower oxidation potential and higher reduction potential, can preferentially form films on cathode and anode, which can change the film-forming mechanism of the positive and negative electrodes, and obviously reduce the impedance of the electrodes and the increase of electrode impedance during cycling. In addition, the combined use of the difluorophosphate compounds and other film-forming additives can realize the film-forming protection of the positive and negative electrodes, which ensures the quick charge while reducing the side reactions of the positive and negative electrodes, thereby ensuring various performances of the lithium-ion battery during use, such as storage, cycle, rate performances.

In some embodiments of the present application, the content of the film-forming additive is 0.1%-10% by mass or 0.5%-3% by mass or 1%-3% by mass of the total mass of the electrolyte. An appropriate content of the film-forming additive within this range can ensure stable structure of the positive electrode material and good cycle of the battery. If the content of the film-forming additive is lower than 0.1% by mass of the total mass of the electrolyte, the effect of stabilizing the positive electrode material cannot be fully realized. However, if the content of the film-forming additive is higher than 10% by mass of the total mass of the electrolyte, the content of the additive in the electrolyte will be too high, which is not conducive to the full electrochemical effect of the electrolyte.

In some embodiments of the present application, the secondary battery has an electrolyte retention coefficient of 2 g/Ah to 4 g/Ah, or 3 g/Ah to 4 g/Ah. Herein, the "electrolyte retention coefficient" in g/Ah refers to the ratio of the minimum electrolyte injection amount that ensures the normal work of the battery during the whole life cycle to the designed capacity of the battery cell. The electrolyte retention coefficient of the secondary battery within the range is beneficial to the stability of the positive electrode material of the battery during operation and the realization of good cycle performance.

In the embodiments of the present application, the mass range of the positive electrode active material required per unit capacity of the secondary battery is 4 g/Ah to 10 g/Ah, or 6 g/Ah to 10 g/Ah. The mass range of the positive electrode active material ensures the normal operation of the secondary battery and realizes the required unit capacity.

In some embodiments of the present application, the cyclic carbonate compounds are selected from vinylene carbonate, vinyl ethylene carbonate or a combination thereof; and/or the fluorinated cyclic carbonate compounds are selected from fluoroethylene carbonate, 4,4-difluoroethylene carbonate, 4,5-difluoroethylene carbonate or a combination thereof; and/or the sulfate compounds are selected from 1,3,2-dioxathiolane-2,2-dioxide, 4,4-bis(1,3,2-dioxathiolane)-2,2,2,2-tetraoxide or a combination thereof; and/or the sulfonate compounds are selected from 1,3-propane sultone, propylene sultone, butene sultone, vinyl methanedisulfonate or a combination thereof. These further selected film-forming additives can better form a stable interfacial film on the surface of the positive electrode, which can reduce the occurrence of the side reactions of the positive electrode, and improve the cycle performance of the battery. In addition, the combined use of these film-forming additives and difluorophosphate compounds can realize the film-forming protection of the positive and negative electrodes, which ensures the quick charge while reducing the side reactions of the positive and negative electrodes, thereby ensuring various performances of the lithium-ion battery during use, such as storage, cycle, rate performance, etc.

In some embodiments of the present application, the lithium salt is at least one selected from $LiN(SO_2F)_2$(LiFSI), $LiPF_6$, $LiBF_4$, $LiN(CF_3SO_2)_2$(LiTFSI), $LiClO_4$, $LiAsF_6$, $LiB(C_2O_4)_2$(LiBOB), $LiBF_2C_2O_4$(LiDFOB), and lithium difluorobis(oxalato)phosphate (LiDFOP). The lithium salts can improve the stability of the electrolyte and the positive and negative electrode materials, can form a stable interface film on the electrode surface, which can effectively inhibit the decomposition of the electrolyte and the destruction of the electrode structure during high-voltage cycle, thereby improving the electrochemical performance of the battery, especially the cycle performance.

In some embodiments of the present application, the solvent is at least one selected from ethylene carbonate, propylene carbonate, fluoroethylene carbonate, dimethyl carbonate, diethyl carbonate, methyl propyl carbonate, ethyl methyl carbonate, ethyl acetate, methyl acetate, ethyl propionate, acetonitrile, tetrahydrofuran, 2-methyltetrahydrofuran, and 1,3-dioxolane. These solvents are beneficial to the stability of the battery during operation.

Another embodiment of the present application further provides a method for evaluating the relationship between the content of a film-forming additive in an electrolyte of a secondary battery and the content of nickel and cobalt in a positive electrode active material, the method comprises allowing the content of the film-forming additive, the nickel and the cobalt to satisfy the following formula (1):

$$0.1 \times 10^{-2} \leq \frac{A*B}{M*(C+N)} \leq 3 \times 10^{-2} \quad (1)$$

wherein A is the mass percentage of the film-forming additive in the total mass of the electrolyte; B is the electrolyte retention coefficient of the secondary battery, in g/Ah; M is the mass of the positive electrode active material required per unit capacity of the secondary battery, in g/Ah; N is the mass percentage of nickel in the positive electrode active material of the secondary battery; and C is the mass percentage of Co in the positive electrode active material of the secondary battery.

Therefore, the present applicant has unexpectedly found that when designing a secondary battery, it is possible to guide the use of the film-forming additive in the electrolyte of the low-Co positive electrode material by evaluating whether the content of the film-forming additive in the electrolyte of the secondary battery matches the content of nickel and cobalt in the positive electrode active material using the above formula (1). The applicant has found that by the evaluation method, the secondary battery satisfying the above formula (1) maintains the stability of the positive electrode structure during the run process and achieves a better cycle life and a lower cycle DCR increase.

In the evaluation method of the present application $$\frac{A*B}{M*(C+N)}$$

can be $0.1\times10^{-2}$, $0.2\times10^{-2}$, $0.3\times10^{-2}$, $0.4\times10^{-2}$, $0.5\times10^{-2}$, $0.6\times10^{-2}$, $0.7\times10^{-2}$, $0.8\times10^{-2}$, $0.9\times10^{-2}$, $1\times10^{-2}$, $1.1\times10^{-2}$, $1.2\times10^{-2}$, $1.3\times10^{-2}$, $1.4\times10^{-2}$, $1.5\times10^{-2}$, $1.6\times10^{-2}$, $1.7\times10^{-2}$, $1.8\times10^{-2}$, $1.9\times10^{-2}$, $2.0\times10^{-2}$, $2.1\times10^{-2}$, $2.2\times10^{-2}$, $2.3\times10^{-2}$, $2.4\times10^{-2}$, $2.5\times10^{-2}$, $2.6\times10^{-2}$, $2.7\times10^{-2}$, $2.8\times10^{-2}$, $2.9\times10^{-2}$ or $3\times10^{-2}$, or within a range with any two of these values as an upper limit and a lower limit (including the upper and lower limits).

In the evaluation method of the present application, the formula (1) may further satisfy the following relationship:

$$0.4\times10^{-2} \le \frac{A*B}{M*(C+N)} \le 2.1\times10^{-2}.$$

In the evaluation method of the present application, the formula (1) may further satisfy the following relationship:

$$0.42\times10^{-2} \le \frac{A*B}{M*(C+N)} \le 1.04\times10^{-2}.$$

In the evaluation method of the present application, the film-forming additive is at least one selected from the group consisting of: difluorophosphate compounds, cyclic carbonate compounds, fluorinated cyclic carbonate compounds, cyclic sulfate compounds, and sulfonate compounds; in some embodiments, difluorophosphate compounds.

In the evaluation method of the present application, the difluorophosphate compounds have the following structure:

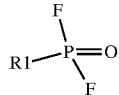

wherein R1 is selected from a hydrogen atom, an oxygen atom, a carbon atom, a nitrogen atom, a sulfur atom, a phosphorus atom, a fluorine atom, an alkyl group, a phenyl group, an alkoxy group, a phenoxy group, a fluorine-containing alkyl group, a fluorine-containing phenyl group, a fluorine-containing alkoxy group or a fluorine-containing phenoxy group. The alkyl group may be a $C_1$-$C_{10}$ alkyl group or a $C_1$-$C_6$ alkyl group. The alkoxy group is a $C_1$-$C_{10}$ alkoxy group or a $C_1$-$C_6$ alkoxy group. The fluorine-containing alkyl group may be a $C_1$-$C_{10}$ fluorine-containing alkyl group or a $C_1$-$C_6$ fluorine-containing alkyl group. The fluorine-containing alkoxy group may be a $C_1$-$C_{10}$ fluorine-containing alkoxy group or a $C_1$-$C_6$ fluorine-containing alkoxy group. Further, the difluorophosphate compounds are selected from: butyl difluorophosphate, phenyl difluorophosphate, and a combination thereof.

In the evaluation method of the present application, the content of the film-forming additive is 0.1%-10% by mass or 0.5%-3% by mass or 1%-3% by mass of the total mass of the electrolyte.

In the evaluation method of the present application, the secondary battery has an electrolyte retention coefficient of 2 g/Ah to 4 g/Ah, or 3 g/Ah to 4 g/Ah.

In the evaluation method of the present application, the mass range of the positive electrode active material required per unit capacity of the secondary battery is 4 g/Ah to 10 g/Ah, or 6 g/Ah to 10 g/Ah.

In the evaluation method of the present application, the cyclic carbonate compounds are selected from vinylene carbonate, vinyl ethylene carbonate or a combination thereof; and/or the fluorinated cyclic carbonate compounds are selected from fluoroethylene carbonate, 4,4-difluoroethylene carbonate, 4,5-difluoroethylene carbonate or a combination thereof; and/or the sulfate compounds are selected from 1,3,2-dioxathiolane-2,2-dioxide, 4,4-bis(1,3,2-dioxathiolane)-2,2,2,2-tetraoxide or a combination thereof; and/or the sulfonate compounds are selected from 1,3-propane sultone, propylene sultone, butene sultone, vinyl methanedisulfonate or a combination thereof.

In the evaluation method of the present application, the lithium salt is at least one selected from LiN(SO$_2$F)$_2$(LiFSI), LiPF$_6$, LiBF$_4$, LiN(CF$_3$SO$_2$)$_2$(LiTFSI), LiClO$_4$, LiAsF$_6$, LiB(C$_2$O$_4$)$_2$(LiBOB), LiBF$_2$C$_2$O$_4$(LiDFOB), and lithium difluorobis(oxalato)phosphate (LiDFOP).

In the evaluation method of the present application, the solvent is at least one selected from ethylene carbonate, propylene carbonate, fluoroethylene carbonate, dimethyl carbonate, diethyl carbonate, methyl propyl carbonate, ethyl methyl carbonate, ethyl acetate, methyl acetate, ethyl propionate, acetonitrile, tetrahydrofuran, 2-methyltetrahydrofuran, and 1,3-dioxolane.

In addition, the secondary battery, battery module, battery pack and power consuming device of the present application are described below with reference to the accompanying drawings as appropriate.

In one embodiment of the present application, a secondary battery is provided.

Typically, a secondary battery comprises a positive electrode plate, a negative electrode plate, an electrolyte and a separator. During the charge/discharge process of the battery, active ions are intercalated and de-intercalated back and forth between the positive electrode plate and the negative electrode plate. The electrolyte is located between the positive electrode plate and the negative electrode plate and functions for ionic conduction. The separator is provided between the positive electrode plate and the negative electrode plate, and mainly prevents the positive and negative electrodes from short-circuiting and enables ions to pass through.

[Positive Electrode Plate]

The positive electrode plate comprises a positive electrode current collector and a positive electrode film layer provided on at least one surface of the positive electrode current collector, the positive electrode film layer comprising a positive electrode active material.

As examples, the positive electrode current collector has two surfaces opposite in its own thickness direction, and the positive electrode film layer is provided on either or both of the two opposite surfaces of the positive electrode current collector.

In some embodiments, the positive electrode current collector can be a metal foil or a composite current collector. For example, as a metal foil, an aluminum foil can be used. The composite current collector may comprise a polymer material substrate and a metal layer formed on at least one surface of the polymer material substrate. The composite current collector can be formed by forming a metal material (aluminum, an aluminum alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the positive electrode active material can be a positive electrode active material known in the art for batteries. As an example, the positive electrode active material may include at least one of the following materials:

lithium-containing phosphates of an olivine structure, lithium transition metal oxides and their respective modified compounds. However, the present application is not limited to these materials, and other conventional materials that can be used as positive electrode active materials for batteries may also be used. These positive electrode active materials may be used alone or in combination of two or more. Herein, examples of lithium transition metal oxides may include, but are not limited to, at least one of lithium cobalt oxide (e.g. $LiCoO_2$), lithium nickel oxide (e.g. $LiNiO_2$), lithium manganese oxide (e.g. $LiMnO_2$, $LiMn_2O_4$), lithium nickel cobalt oxide, lithium manganese cobalt oxide, lithium nickel manganese oxide, lithium nickel cobalt manganese oxide (e.g. $LiNi_{1/3}Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$), lithium nickel cobalt aluminum oxide (e.g. $LiNi_{0.85}Co_{0.15}Al_{0.05}O_2$), or modified compounds thereof, or the like. Examples of lithium-containing phosphates of olivine structure may include, but are not limited to, at least one of lithium iron phosphate (e.g. $LiFePO_4$ (also referred to as LFP)), lithium iron phosphate and carbon composites, lithium manganese phosphate (e.g. $LiMnPO_4$), lithium manganese phosphate and carbon composites, lithium iron manganese phosphate, or lithium iron manganese phosphate and carbon composites. In the present application, the positive electrode active material is a nickel-cobalt-manganese ternary material, and its structural formula is $LiNi_xCo_yMn_zO_2$, wherein $0.5 \le x \le 0.85$, $0.01 \le y \le 0.2$, $0 \le z \le 0.5$, and $x+y+z=1$.

In some embodiments, the positive electrode film layer may optionally comprise a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, or fluorine-containing acrylate resin.

In some embodiments, the positive electrode film layer may optionally comprise a conductive agent. As an example, the conductive agent may include at least one of superconducting carbon, acetylene black, carbon black, Ketjen black, carbon dots, carbon nanotubes, graphene, or carbon nanofibers.

In some embodiments, the positive electrode plate can be prepared as follows: the above-mentioned components for preparing the positive electrode plate, such as positive electrode active material, conductive agent, binder and any other components, are dispersed in a solvent (e.g. N-methylpyrrolidone) to form a positive electrode slurry; and the positive electrode slurry is coated onto a positive electrode current collector, and is then subjected to procedures such as drying and cold pressing, so as to obtain the positive electrode plate.

[Negative Electrode Plate]

The negative electrode plate comprises a negative electrode current collector and a negative electrode film layer provided on at least one surface of the negative electrode current collector, the negative electrode film layer comprising a negative electrode active material.

As an example, the negative electrode current collector has two surfaces opposite in its own thickness direction, and the negative electrode film layer is provided on either or both of the two opposite surfaces of the negative electrode current collector.

In some embodiments, the negative electrode current collector can be a metal foil or a composite current collector. For example, as a metal foil, a copper foil can be used. The composite current collector may comprise a polymer material substrate and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative electrode active material can be a negative electrode active material known in the art for batteries. As an example, the negative electrode active material may include at least one of the following materials: artificial graphite, natural graphite, soft carbon, hard carbon, a silicon-based material, a tin-based material and lithium titanate, etc. The silicon-based material may be at least one selected from elemental silicon, silicon oxides, silicon carbon composites, silicon nitrogen composites and silicon alloys. The tin-based material may be at least one selected from elemental tin, tin oxides, and tin alloys. However, the present application is not limited to these materials, and other conventional materials that can be used as negative electrode active materials for batteries can also be used. These negative electrode active materials may be used alone or in combination of two or more. In the present application, the negative electrode active material may be at least one selected from artificial graphite, natural graphite, soft carbon, hard carbon, and a silicon-based material.

In some embodiments, the negative electrode film layer may optionally comprise a binder. The binder may be at least one selected from a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer may optionally comprise a conductive agent. The conductive agent may be at least one selected from superconductive carbon, acetylene black, carbon black, ketjenblack, carbon dots, carbon nanotubes, graphene, and carbon nanofibers.

In some embodiments, the negative electrode film layer may optionally comprise other auxiliary agents, such as thickener (e.g. sodium carboxymethyl cellulose (CMC-Na)) and the like.

In some embodiments, the negative electrode plate can be prepared as follows: the above-mentioned components for preparing the negative electrode plate, such as negative electrode active material, conductive agent, binder and any other components, are dispersed in a solvent (e.g. deionized water) to form a negative electrode slurry; and the negative electrode slurry is coated onto a negative electrode current collector, and is then subjected to procedures such as drying and cold pressing, so as to obtain the negative electrode plate.

[Electrolyte]

The electrolyte is located between the positive electrode plate and the negative electrode plate and functions for ionic conduction. In the present application, the electrolyte of the first aspect of the present application includes a solvent, a lithium salt and a film-forming additive. In some embodiments of the present application, the solvent is at least one selected from ethylene carbonate, propylene carbonate, fluoroethylene carbonate, dimethyl carbonate, diethyl carbonate, methyl propyl carbonate, ethyl methyl carbonate, ethyl acetate, methyl acetate, ethyl propionate, acetonitrile, tetrahydrofuran, 2-methyltetrahydrofuran, and 1,3-dioxolane. The lithium salt may be at least one selected from LiN(SO$_2$F)$_2$(LiFSI), LiPF$_6$, LiBF$_4$, LiN(CF$_3$SO$_2$)$_2$(LiTFSI), LiClO$_4$, LiAsF$_6$, LiB(C$_2$O$_4$)$_2$(LiBOB), LiBF$_2$C$_2$O$_4$(LiDFOB), and lithium difluorobis(oxalato)phosphate (LiDFOP). The film-forming additive may be selected from difluorophosphate compounds, cyclic carbonate compounds, fluorinated cyclic carbonate compounds, cyclic sulfate compounds, and sulfonate compounds, and any combination thereof.

In addition, the electrolyte may optionally include other additives, for example, an additive capable of improving certain performances of the battery, such as an additive capable of improving the overcharge performance of the battery, an additive capable of improving the high- or low-temperature performance of the battery, and the like.

[Separator]

In some embodiments, the secondary battery further comprises a separator. The type of the separator is not particularly limited in the present application, and any well known porous-structure separator with good chemical stability and mechanical stability may be selected.

In some embodiments, the material of the separator can be at least one selected from glass fibers, a non-woven, polyethylene, polypropylene and polyvinylidene fluoride. The separator may be a single-layer film and also a multi-layer composite film, and is not limited particularly. When the separator is a multi-layer composite film, the materials in the respective layers may be same or different, which is not limited particularly.

In some embodiments, the positive electrode plate, the negative electrode plate and the separator can be manufactured into an electrode assembly by means of a winding process or a lamination process.

In some embodiments, the secondary battery may comprise an outer package. The outer package can be used to encapsulate the above-mentioned electrode assembly and electrolyte.

In some embodiments, the outer package of the secondary battery can be a hard shell, for example, a hard plastic shell, an aluminum shell, a steel shell, etc. The outer package of the secondary battery may also be a soft package, such as a pouch-type soft package. The material of the soft package may be plastics, and the examples of plastics may include polypropylene, polybutylene terephthalate, and polybutylene succinate, etc.

Figure 5:
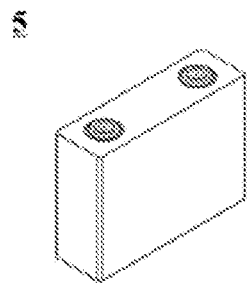
FIG. 5 is the schematic diagram of a secondary battery according to an embodiment of the present application.

The shape of the secondary battery is not particularly limited in the present application, and may be cylindrical, square or of any other shape. For example, FIG. 5 shows a secondary battery 5 with a square structure as an example.

Figure 6:
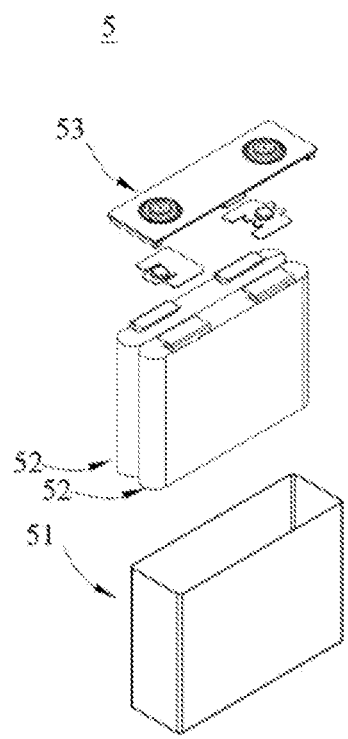
FIG. 6 is the exploded view of a secondary battery according to an embodiment of the present application as shown in FIG. 5.

In some embodiments, referring to FIG. 6, the outer package may comprise a housing 51 and a cover plate 53. Herein, the housing 51 may comprise a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate and the separator can form an electrode assembly 52 by a winding process or a lamination process. The electrode assembly 52 is encapsulated in the accommodating cavity. An electrolyte solution is infiltrated into the electrode assembly 52. The number of the electrode assemblies 52 contained in the secondary battery 5 may be one or more, and can be selected by those skilled in the art according to actual requirements.

In some embodiments, the secondary battery can be assembled into a battery module, and the number of the secondary batteries contained in the battery module may be one or more, and the specific number can be selected by those skilled in the art according to the application and capacity of the battery module.

Figure 7:
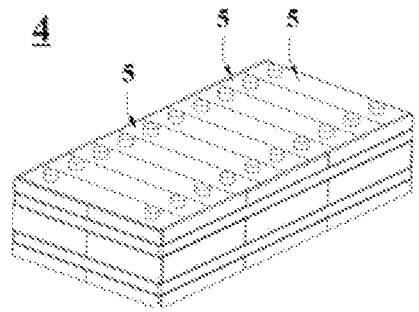
FIG. 7 is the schematic diagram of a battery module according to an embodiment of the present application.

FIG. 7 shows a battery module 4 as an example. Referring to FIG. 7, in the battery module 4, a plurality of secondary batteries 5 may be arranged in sequence in the length direction of the battery module 4. Apparently, the secondary batteries may also be arranged in any other manner. Furthermore, the plurality of secondary batteries 5 may be fixed by fasteners.

Optionally, the battery module 4 may also comprise a housing with an accommodating space, and a plurality of secondary batteries 5 are accommodated in the accommodating space.

In some embodiments, the above-mentioned battery module may also be assembled into a battery pack, the number of battery modules included in the battery pack may be one or more, and the specific number can be selected by those skilled in the art according to the application and capacity of the battery pack.

Figure 8:
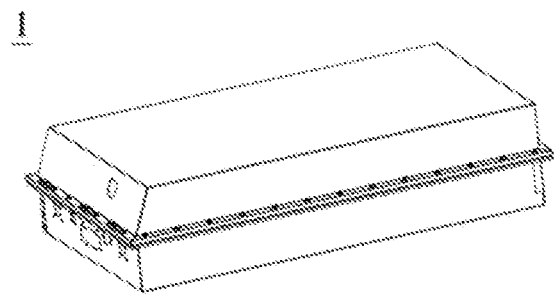
FIG. 8 is the schematic diagram of a battery pack according to an embodiment of the present application.
Figure 9:
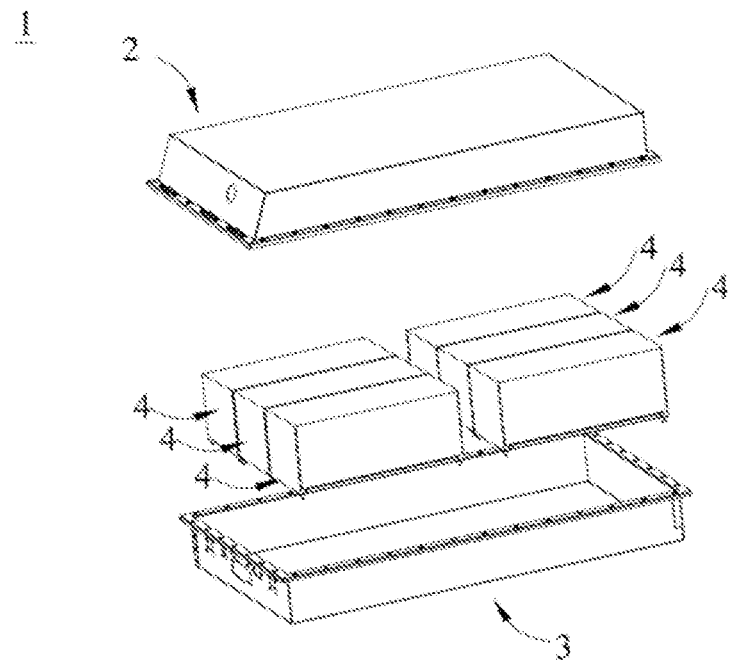
FIG. 9 is the exploded view of a battery pack according to an embodiment of the present application as shown in FIG. 8.

FIG. 8 and FIG. 9 show a battery pack 1 as an example. Referring to FIG. 8 and FIG. 9, the battery pack 1 may comprise a battery box and a plurality of battery modules 4 provided in the battery box. The battery box comprises an upper box body 2 and a lower box body 3, wherein the upper box body 2 can cover the lower box body 3 to form a closed space for accommodating the battery modules 4. A plurality of battery modules 4 may be arranged in the battery box in any manner.

In addition, the present application further provides a power consuming device. The power consuming device comprises at least one of the secondary battery, battery module, or battery pack provided by the present application. The secondary battery, battery module or battery pack may be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like, but is not limited thereto.

As for the power consuming device, the secondary battery, battery module or battery pack can be selected according to the usage requirements thereof.

Figure 10:
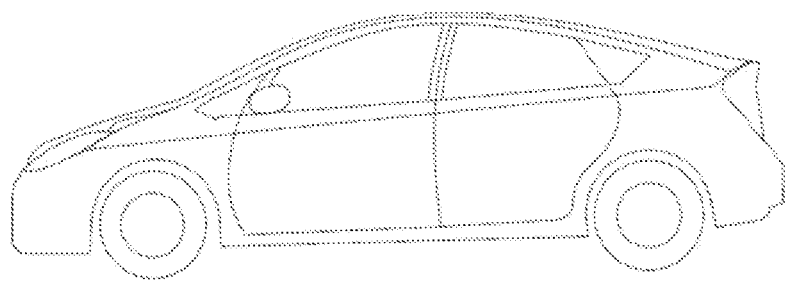
FIG. 10 is the schematic diagram of a power consuming device according to an embodiment of the present application with the secondary battery as a power source.

FIG. 10 shows a power consuming device as an example. The power consuming device may be a battery electric vehicle, a hybrid electric vehicle, a plug-in hybrid electric vehicle, or the like. In order to meet the requirements of the power consuming device for a high power and a high energy density of a secondary battery, a battery pack or a battery module may be used.

As another example, the device may be a mobile phone, a tablet, a laptop computer, etc. The device is generally required to be thin and light, and may use a secondary battery as a power source.

EXAMPLES

Hereinafter, the examples of the present application will be explained. The examples described below are exemplary and are merely for explaining the present application, and should not be construed as limiting the present application.

The techniques or conditions that are not specified in examples are according to the techniques or conditions described in documents in the art or the product introduction. The reagents or instruments used, if they are not marked with the manufacturer, are common products that are commercially available.

Example 1

Preparation of Secondary Battery
1. Preparation of Electrolyte

The electrolyte is prepared in a glove box under an argon atmosphere with a water content of <10 ppm. First, ethylene carbonate/diethyl carbonate/ethyl methyl carbonate are mixed at a mass ratio of 3/5/2, and then 13% by mass of $LiPF_6$, 0.144% by mass of butyl difluorophosphate, and 2 wt % of ethylene sulfate (DTD) are added to the above mixed solvent to prepare the electrolyte. The amount of the above lithium salt and the amount of the additive are percentages calculated based on the total weight of the electrolyte.

2. Preparation of Positive Electrode

A positive electrode active material $LiNi_{0.65}Co_{0.07}Mn_{0.28}O_2$, a binder polyvinylidene fluoride, and a conductive agent acetylene black are mixed at a weight ratio of 98:1:1, same is dispersed in a solvent N-methylpyrrolidone (NMP) to prepare a positive electrode slurry, which is then coated on a current collector aluminum foil and dried, then cold-pressing, edge-cutting, slicing, slitting, etc. are performed to prepare the positive electrode of the secondary battery.

3. Preparation of Negative Electrode

A negative electrode active material artificial graphite, a conductive agent carbon black, a thickening agent sodium carboxymethyl cellulose (CMC), and a binder styrene butadiene rubber (SBR) are mixed at a weight ratio of 96:2:1:1 and dispersed in a solvent deionized water, and stirred by a vacuum stirrer to obtain a negative electrode slurry; then the negative electrode slurry is coated on a current collector copper foil and dried, and cold-pressing, edge-cutting, slicing, slitting, etc. are performed to prepare the negative electrode of the secondary battery.

4. Separator

A commercially available polypropylene film is used as the separator (Hunan Zhongli New Material Technology Co., Ltd., SBA).

5. Assembly of Battery

The above positive electrode, separator and negative electrode are wound or stacked in sequence, such that the separator is located between the positive electrode and the negative electrode to obtain a naked battery cell, the naked battery cell is placed in an aluminum-plastic shell outer package, the prepared electrolyte is injected into the dried battery cell, and the secondary battery is obtained after the procedures of standing, formation, shaping, etc.

The electrolyte retention coefficient of the prepared secondary battery is determined according to the following steps:

1. According to the above manufacturing process for the secondary battery, a lea soft package battery (one battery cell) is manufactured, in which the amount of electrolyte injection is assumed to be W, and the battery cell retains an air bag.

2. M0 test of minimum electrolyte retention amount which meets the normal work of the battery cell EOL process: the manufactured lea soft package battery cell with the air bag is subjected to a constant current full discharge test at 0.33 C, and weighed and recorded as W1 after the test, the air bag of the battery cell is placed downward in a centrifuge for centrifugation; the battery cell is taken out after the centrifugation is finished and kept vertically, such that the air bag is located at the bottom of the battery cell, and the battery cell will not topple over. The air bag is then cut, 1 cm length of the air bag is reserved for packaging during the cutting process, the electrolyte centrifuged from the air bag is poured into a beaker, the cut battery cell is weighed and recorded as W2; the cut out air bag is washed with alcohol, placed into an oven at 60° C. and baked in vacuum for 4 h, and weighed and recorded as W3, the final electrolyte retention amount M0=W−W1+W2+W3 in the battery cell, the battery cells with different electrolyte retention amounts are obtained by controlling centrifugation. Then, the secondary battery is charged to 4.35 V at a constant current of 0.5 C, and then charged to a current of 0.05 C at a constant voltage of 4.35 V. After standing for 5 minutes, it is discharged to the lower limit of cut-off voltage of 2.8 V at a constant current of 1 C. The temperature is kept at 25° C., cyclic charge and discharge are performed under the charge and discharge condition until the capacity retention rate is 80%, and the minimum electrolyte retention amount M0 capable of meeting the normal cycle of the battery cell can be determined according to cycle data.

3. The electrolyte retention coefficient B is a ratio of M0 to the designed capacity of the battery cell.

It is determined that the prepared secondary battery has an electrolyte retention coefficient of 3 g/Ah and a weight of the positive electrode active material required per unit capacity of 6 g/Ah.

Example 2

A secondary battery is prepared in the same manner as in example 1, except that the addition amount of butyl difluorophosphate is changed to 0.576% by mass.

Example 3

A secondary battery is prepared in the same manner as in example 1, except that the addition amount of butyl difluorophosphate is changed to 1% by mass.

Example 4

A secondary battery is prepared in the same manner as in example 1, except that the addition amount of butyl difluorophosphate is changed to 3% by mass.

Example 5

A secondary battery is prepared in the same manner as in example 1, except that the positive electrode active material is changed to $LiNi_{0.50}Co_{0.07}Mn_{0.43}O_2$ and the addition amount of butyl difluorophosphate is changed to 1% by mass.

Example 6

A secondary battery is prepared in the same manner as in example 1, except that the positive electrode active material is changed to $LiNi_{0.85}Co_{0.07}Mn_{0.08}O_2$ and the addition amount of butyl difluorophosphate is changed to 1% by mass.

Example 7

A secondary battery is prepared in the same manner as in example 1, except that the positive electrode active material is changed to $LiNi_{0.65}Co_{0.01}Mn_{0.34}O_2$ and the addition amount of butyl difluorophosphate is changed to 1% by mass.

Example 8

A secondary battery is prepared in the same manner as in example 1, except that the positive electrode active material is changed to $LiNi_{0.65}Co_{0.2}Mn_{0.15}O_2$ and the addition amount of butyl difluorophosphate is changed to 1% by mass.

Example 9

A secondary battery is prepared in the same manner as in example 1, except that the addition amount of butyl difluorophosphate is changed to 1% by mass and the electrolyte retention coefficient is changed to 2 g/Ah.

Example 10

A secondary battery is prepared in the same manner as in example 1, except that the addition amount of butyl difluorophosphate is changed to 1% by mass and the electrolyte retention coefficient is changed to 4 g/Ah.

Example 11

A secondary battery is prepared in the same manner as in example 1, except that the addition amount of butyl difluorophosphate is changed to 1% by mass and the weight of the positive electrode active material required per unit capacity is changed to 4 g/Ah.

Example 12

A secondary battery is prepared in the same manner as in example 1, except that the addition amount of butyl difluorophosphate is changed to 1% by mass and the weight of the positive electrode active material required per unit capacity is changed to 10 g/Ah.

Example 13

A secondary battery is prepared in the same manner as in example 1, except that butyl difluorophosphate is replaced with 0.576% by mass of phenyl difluorophosphate.

Example 14

A secondary battery is prepared in the same manner as in example 1, except that butyl difluorophosphate is replaced with 1% by mass of phenyl difluorophosphate.

Example 15

A secondary battery is prepared in the same manner as in example 1, except that 1.98% by mass of butyl difluorophosphate is used, the electrolyte retention coefficient is 4 g/Ah, the Co content is 1%, and the weight of the positive electrode active material required per unit capacity is 4 g/Ah.

Comparative Examples 1 and 2

In the same manner as in example 1, secondary batteries are prepared according to the parameters corresponding to comparative examples 1 and 2 in Table 1.

The secondary batteries of above examples 1-15 and comparative examples 1-2 are tested according to the following test procedures.

1. Cycle Life Test at 25° C.

The secondary batteries are left to stand at 25° C. for 5 min, charged to 4.35 V at a constant current of 0.5 C, further charged to a current of 0.05 C at a constant voltage of 4.35 V, left to stand for 5 min, and further discharged to the lower limit of cut-off voltage of 2.8 V at a constant current of 1 C. The charge and discharge cycle is performed under the charge and discharge conditions until the lithium-ion batteries reach a capacity retention ratio of 80%, thereby obtaining the number of cycles of the secondary battery under the condition of 80% capacity retention rate.

2. DCR Increase Rate Performance Test of Lithium Ion Battery Cycling to 800 Times at 25° C.

DCR test at 25° C. before cycling: A freshly prepared battery cell is charged to 4.35 V at 0.5 C at 25° C. and then charged to 0.05 C at a constant voltage, at which time the voltage is V1; the battery cell is discharged at 4 C for 30 s, the voltage at the end of the discharge is V2, the data point is picked every 0.1 s, and discharge DCR1 of the battery cell with 100% SOC before the cycling is (V1−V2)/I.

Cycle process at 25° C.: After the DCR test at 25° C. before cycling, the lithium-ion batteries are left to stand at 25° C. for 5 min, charged to 4.35 V at a constant current of 0.5 C, further charged to a current of 0.05 C at a constant voltage of 4.35 V, left to stand for 5 min, and further discharged the lower limit of cut-off voltage of 2.8 V at a constant current of 1 C, and 800 cycles of charge and discharge are performed under the charge and discharge conditions.

DCR test at 25° C. after cycling: The battery cell after the cycling is charged to 4.35 V at 0.5 C at 25° C. and then charged to 0.05 C at a constant voltage of, at which time the voltage is V3; the battery cell is discharged at 4 C for 30 s, the voltage at the end of the discharge is V4, the data point is picked every 0.1 s, and discharge DCR2 of the battery cell with 100% SOC after the cycling is (V3−V4)/I.

DCR increase rate: DCR increase rate is (DCR2−DCR1)/DCR1*100%.

The test results of the secondary batteries of examples 1-15 and comparative examples 1-2 are shown in the following Table 1.

TABLE 1

| Example No. | A (Content of butyl difluoro- phosphate in electrolyte, % by mass) | A (Content of phenyl difluoro- phosphate in electrolyte, % by mass) | B (Electrolyte retention coefficient, g/Ah) | N (Content of Ni in positive electrode active material, % by mass) | C (Content of Co in positive electrode active material, % by mass) | M (Weight of positive electrode active material required per unit capacity, g/Ah) | DTD/ % | $A*B/M*(C+30+0N)$ $(\times 10^{-2})$ | Cycle life@ 25° C. (Number of cycles) | Cycle DCR increase rate@ 25° C., % |
|---|---|---|---|---|---|---|---|---|---|---|
| Example 1 | 0.144 | / | 3 | 65 | 7 | 0 | 2 | 0.10 | 1000 | 85 |
| Example 2 | 0.576 | / | 3 | 65 | 7 | 0 | 2 | 0.40 | 1200 | 75 |
| Example 3 | 1 | / | 3 | 65 | 7 | 0 | 2 | 0.69 | 1510 | 59 |
| Example 4 | 3 | / | 3 | 65 | 7 | 0 | 2 | 2.08 | 1300 | 72 |
| Example 5 | 1 | / | 3 | 50 | 7 | 0 | 2 | 0.88 | 1620 | 58 |
| Example 6 | 1 | / | 3 | 85 | 7 | 0 | 2 | 0.54 | 1510 | 59 |
| Example 7 | 1 | / | 3 | 65 | 1 | 0 | 2 | 0.76 | 1420 | 65 |
| Example 8 | 1 | / | 3 | 65 | 20 | 0 | 2 | 0.59 | 1720 | 39 |
| Example 9 | 1 | / | 2 | 65 | 7 | 0 | 2 | 0.46 | 1470 | 65 |
| Example 10 | 1 | / | 4 | 65 | 7 | 0 | 2 | 0.93 | 1700 | 52 |
| Example 11 | 1 | / | 3 | 65 | 7 | 4 | 2 | 1.04 | 1580 | 58 |
| Example 12 | 1 | / | 3 | 65 | 7 | 10 | 2 | 0.42 | 1640 | 57 |
| Example 13 | / | 0.576 | 3 | 65 | 7 | 0 | 2 | 0.40 | 1100 | 77 |
| Example 14 | / | 1 | 3 | 65 | 7 | 0 | 2 | 0.69 | 1450 | 61 |
| Example 15 | 1.98 | / | 4 | 65 | 1 | 4 | 2 | 3 | 1400 | 67 |
| Comparative example 1 | 0 | 0 | 3 | 65 | 7 | 5 | 2 | 0.00 | 800 | 100 |
| Comparative example 2 | 1 | / | 2 | 65 | 1 | 1 | 2 | 3.03 | 850 | 94 |

It can be seen from Table 1 that $$\frac{A*B}{M*(C+N)}$$

values of examples 1-14 of the present application are all within a range of $0.1\times10^{-2}$ to $3\times10^{-2}$, while the corresponding values of comparative examples 1 and 2 are outside the range. The secondary batteries of examples 1-14 of the present application all have a cycle life of 1,000 cycles or more at 25° C., while the secondary batteries of comparative examples 1 and 2 have the number of cycles of 800 and 850, respectively. The secondary batteries of examples 1-14 of the present disclosure all have a cycle DCR increase rate of 85% or less at 25° C., while the secondary batteries of comparative examples 1 and 2 have the cycle DCR increase rate of 100% and 94%, respectively. It can be seen that the secondary batteries of examples 1-14 of the present application have superior cycle and cycle DCR increase performances compared to the secondary batteries of comparative examples 1 and 2.

FIG. 1 shows when compared with the secondary battery of comparative example 1, the change of the capacity retention rate as a function of the number of cycles of the secondary battery of example 3 of the present disclosure when it is cycled according to the conditions described in the above cycle life test at 25° C. It can be seen from FIG. 1 that the capacity retention rate obtained by using the electrolyte containing 1% of butyl difluorophosphate in the present application is significantly better than that of the electrolyte without butyl difluorophosphate.

Figure 2:
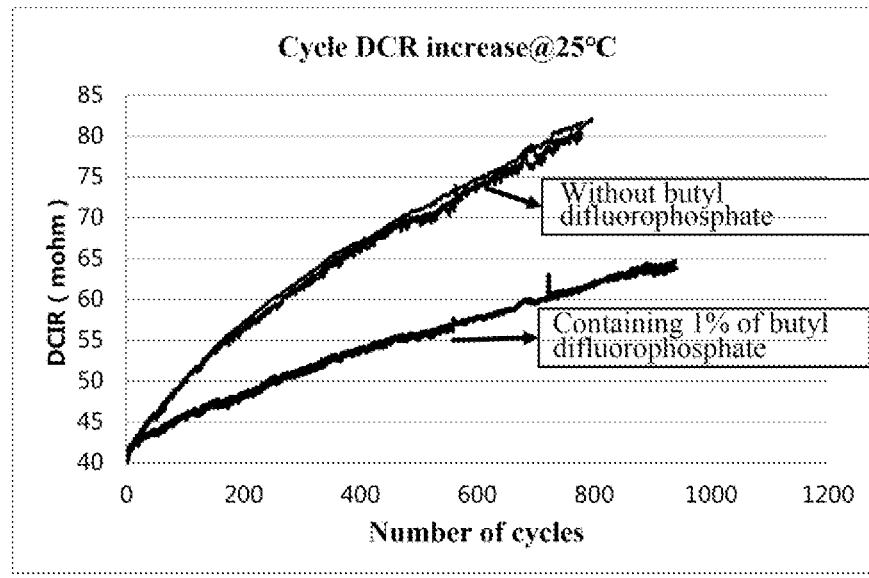
FIG. 2 shows the cycle DCR increase of the secondary battery according to Example 3 of the present application at 25° C. compared with a comparative example.

FIG. 2 shows when compared with the secondary battery of comparative example 1, the change of the cycle DCR increase as a function of the number of cycles of the secondary battery of example 3 of the present disclosure when it is cycled according to the conditions described in the above DCR increase rate performance test at 25° C. It can be seen from FIG. 2 that the cycle DCR increase rate obtained by using the electrolyte containing 1% of butyl difluorophosphate in the present application is significantly lower than that of the electrolyte without butyl difluorophosphate.

Figure 3:
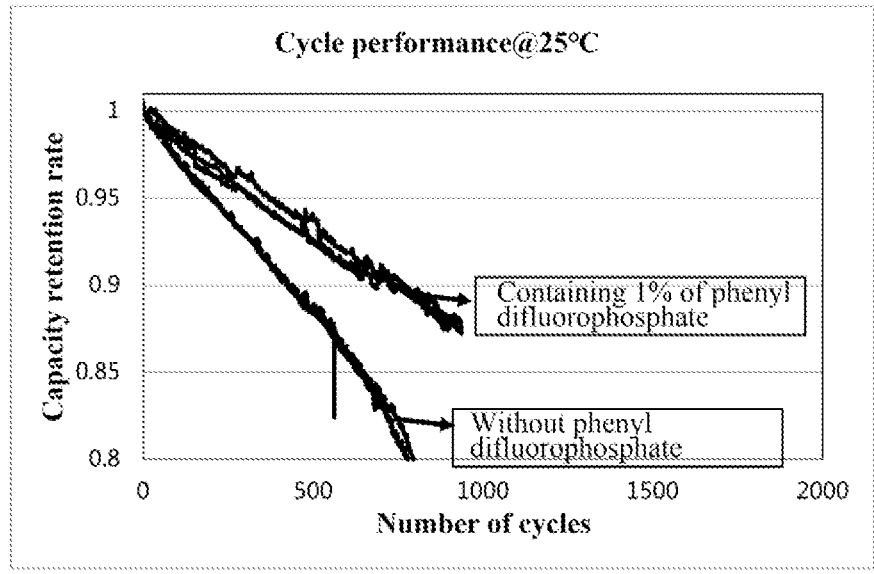
FIG. 3 shows the cycle performance of the secondary battery according to Example 14 of the present application at 25° C. compared with a comparative example.

FIG. 3 shows when compared with the secondary battery of comparative example 1, the change of the capacity retention rate as a function of the number of cycles of the secondary battery of example 14 of the present disclosure when it is cycled according to the conditions described in the above cycle life test at 25° C. It can be seen from FIG. 3 that the capacity retention rate obtained by using the electrolyte containing 1% of phenyl difluorophosphate in the present application is significantly better than that of the electrolyte without phenyl difluorophosphate.

Figure 4:
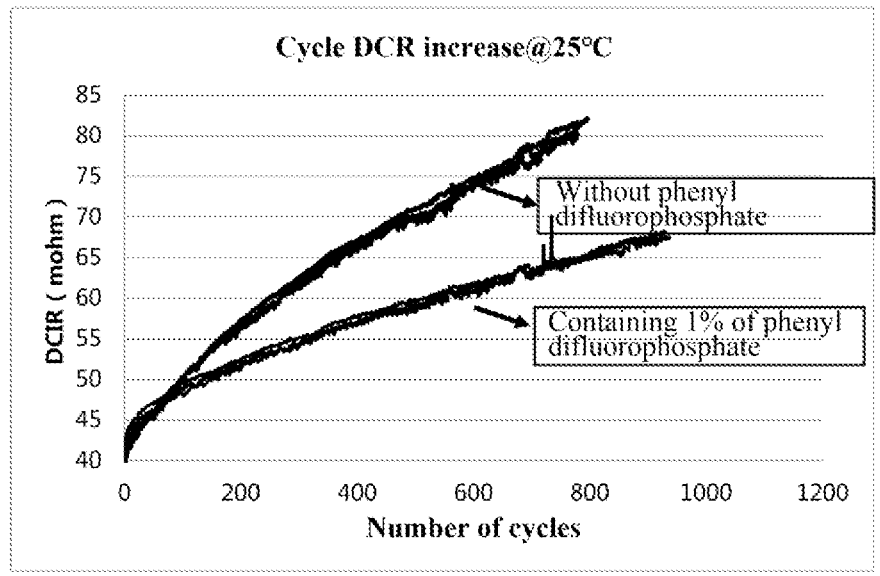
FIG. 4 shows the cycle DCR increase of the secondary battery according to Example 14 of the present application at 25° C. compared with a comparative example.

FIG. 4 shows when compared with the secondary battery of comparative example 1, the change of the cycle DCR increase as a function of the number of cycles of the secondary battery of example 14 of the present disclosure when it is cycled according to the conditions described in the above DCR increase rate performance test at 25° C. It can be seen from FIG. 4 that the cycle DCR increase rate obtained by using the electrolyte containing 1% of phenyl difluorophosphate in the present application is significantly lower than that of the electrolyte without phenyl difluorophosphate.

FIGS. 1-4 further demonstrate that the electrolyte of the present application with a certain amount of the film-forming additive can provide excellent cycle and cycle DCR increase performances.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

The invention claimed is:

1. An electrolyte for a secondary battery, comprising:
   a solvent;
   a lithium salt; and
   a film-forming additive, a content of the film-forming additive being 0.1%-10% by mass of a total mass of the electrolyte, and the content of the film-forming additive satisfying:

$$0.1*10^{-2} \leq \frac{A*B}{M*(C+N)} \leq 3*10^{-2}$$

wherein:
   A is a mass percentage of the film-forming additive in the total mass of the electrolyte;
   B is an electrolyte retention coefficient of the secondary battery, in g/Ah;
   M is a mass of a positive electrode active material required per unit capacity of the secondary battery, in g/Ah;
   N is a mass percentage of nickel in the positive electrode active material contained in the secondary battery; and
   C is a mass percentage of Co in the positive electrode active material contained in the secondary battery.

2. The electrolyte of claim 1, wherein the content of the film-forming additive satisfies:

$$0.4*10^{-2} \leq \frac{A*B}{M*(C+N)} \leq 2.1*10^{-2}.$$

3. The electrolyte of claim 1, wherein the film-forming additive comprises at least one of a difluorophosphate compound, a cyclic carbonate compound, a fluorinated cyclic carbonate compound, a cyclic sulfate compound, or a sulfonate compound.

4. The electrolyte of claim 3, wherein the film-forming additive comprises the difluorophosphate compound, and the difluorophosphate compound has following structure:

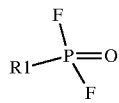

wherein R1 is a hydrogen atom, an oxygen atom, a carbon atom, a nitrogen atom, a sulfur atom, a phosphorus atom, a fluorine atom, an alkyl group, a phenyl group, an alkoxy group, a phenoxy group, a fluorine-containing alkyl group, a fluorine-containing phenyl group, a fluorine-containing alkoxy group, or a fluorine-containing phenoxy group.

5. The electrolyte of claim 4, wherein:
   R1 is the alkyl group, and the alkyl group is a $C_1$-$C_{10}$ alkyl group;
   R1 is the alkoxy group, and the alkoxy group is a $C_1$-$C_{10}$ alkoxy group;
   R1 is the fluorine-containing alkyl group, and the fluorine-containing alkyl group is a $C_1$-$C_{10}$ fluorine-containing alkyl group; or
   R1 is the fluorine-containing alkoxy group, and the fluorine-containing alkoxy group is a $C_1$-$C_{10}$ fluorine-containing alkoxy group.

6. The electrolyte of claim 3, wherein the film-forming additive comprises the difluorophosphate compound, and the difluorophosphate compound comprises at least one of butyl difluorophosphate or phenyl difluorophosphate.

7. The electrolyte of claim 3, wherein:
   the film-forming additive comprises the cyclic carbonate compound, and the cyclic carbonate compound comprises at least one of vinylene carbonate or vinyl ethylene carbonate;
   the film-forming additive comprises the fluorinated cyclic carbonate compound, and the fluorinated cyclic carbonate compound comprises at least one of fluoroethylene carbonate, 4,4-difluoroethylene carbonate, or 4,5-difluoroethylene carbonate;
   the film-forming additive comprises the sulfate compound, and the sulfate compound comprises at least one of 1,3,2-dioxathiolane-2,2-dioxide or 4,4-bis(1,3,2-dioxathiolane)-2,2,2,2-tetraoxide; or
   the film-forming additive comprises the sulfonate compound, and the sulfonate compound comprises at least one of 1,3-propane sultone, propylene sultone, butene sultone, or vinyl methanedisulfonate.

8. The electrolyte of claim 1, wherein the content of the film-forming additive is 0.5%-3% by mass of the total mass of the electrolyte.

9. The electrolyte of claim 1, wherein the electrolyte retention coefficient of the secondary battery is 2 g/Ah to 4 g/Ah.

10. The electrolyte of claim 1, wherein the mass of the positive electrode active material required per unit capacity of the secondary battery is in a range of 4 g/Ah to 10 g/Ah.

11. The electrolyte of claim 1, wherein the lithium salt comprises at least one of $LiN(SO_2F)_2$(LiFSI), $LiPF_6$, $LiBF_4$, $LiN(CF_3SO_2)_2$(LiTFSI), $LiClO_4$, $LiAsF_6$, $LiB(C_2O_4)_2$(LiBOB), $LiBF_2C_2O_4$(LiDFOB), or lithium difluorobis(oxalato)phosphate (LiDFOP).

12. The electrolyte of claim 1, wherein the solvent comprises at least one of ethylene carbonate, propylene carbonate, fluoroethylene carbonate, dimethyl carbonate, diethyl carbonate, methyl propyl carbonate, ethyl methyl carbonate, ethyl acetate, methyl acetate, ethyl propionate, acetonitrile, tetrahydrofuran, 2-methyltetrahydrofuran, or 1,3-dioxolane.

13. A method for evaluating a relationship between a content of a film-forming additive in an electrolyte of a secondary battery and a content of nickel and cobalt in a positive electrode active material, the method comprising causing the content of the film-forming additive, the content of the nickel, and the content of the cobalt to satisfy:

$$0.1*10^{-2} \leq \frac{A*B}{M*(C+N)} \leq 3*10^{-2}$$

wherein:
- A is a mass percentage of the film-forming additive in the total mass of the electrolyte;
- B is an electrolyte retention coefficient of the secondary battery, in g/Ah;
- M is a mass of a positive electrode active material required per unit capacity of the secondary battery, in g/Ah;
- N is a mass percentage of nickel in the positive electrode active material contained in the secondary battery; and
- C is a mass percentage of Co in the positive electrode active material contained in the secondary battery.

14. The method of claim 13, wherein the content of the film-forming additive satisfies:

$$0.4*10^{-2} \leq \frac{A*B}{M*(C+N)} \leq 2.1*10^{-2}.$$

15. The method of claim 13, wherein the film-forming additive comprises at least one of a difluorophosphate compound, a cyclic carbonate compound, a fluorinated cyclic carbonate compound, a cyclic sulfate compound, or a sulfonate compound.

16. A secondary battery comprising:
a positive electrode;
a negative electrode; and
an electrolyte comprising:
  a solvent;
  a lithium salt; and
  a film-forming additive, a content of the film-forming additive being 0.1%-10% by mass of a total mass of the electrolyte, and the content of the film-forming additive satisfying:

$$0.1*10^{-2} \leq \frac{A*B}{M*(C+N)} \leq 3*10^{-2}$$

wherein:
- A is a mass percentage of the film-forming additive in the total mass of the electrolyte;
- B is an electrolyte retention coefficient of the secondary battery, in g/Ah;
- M is a mass of a positive electrode active material required per unit capacity of the secondary battery, in g/Ah;
- N is a mass percentage of nickel in the positive electrode active material contained in the secondary battery; and
- C is a mass percentage of Co in the positive electrode active material contained in the secondary battery.

17. The secondary battery of claim 16, wherein the positive electrode active material comprises a nickel-cobalt-manganese ternary material having a structural formula of $LiNi_xCo_yMn_zO_2$, wherein $0.5 \leq x \leq 0.85$, $0.01 \leq y \leq 0.2$, $0 \leq z \leq 0.5$, and $x+y+z=1$.

18. The secondary battery of claim 16, wherein the negative electrode active material comprises at least one of artificial graphite, natural graphite, soft carbon, hard carbon, or a silicon-based material.

19. A battery module, comprising the secondary battery of claim 16.

20. A power consuming device, comprising the secondary battery of claim 16.

* * * * *